3,296,287
METHOD FOR PREPARING COMPLEXES OF HEAVY METAL HALIDES AND N,N,N',N' - TETRAKIS(HYDROXYALKYL)ALKYLENE DIAMINE
William J. Meyer, Levittown, N.J., assignor to Thiokol Chemical Corporation, Bristol, Pa.
No Drawing. Filed July 2, 1963, Ser. No. 292,463
4 Claims. (Cl. 260—429)

This invention relates to the production of metal halide complexes and in particular to an improved method for the preparation of metal halide complexes of hydroxyalkyl alkylene diamines. These complexes are exceptionally useful accelerators for the vulcanization of sulfur-curable polyurethane elastomers.

Polyurethane polymers having olefinic side chains containing double-bond sites vulcanized by sulfur have been found to possess properties which are much superior to those exhibited by products which are obtained from polyurethane polymers having recurring urea groups in the chain which have been cured by using organic diisocyanates. However, considerable difficulty has been encountered in exploiting the curing potential of these olefinic bonds on the side chains because they do not react satisfactorily with the conventional sulfur curing systems which are used for natural rubber, GR-S, and neoprene. The curing cycle is too long when conventional systems are used and the process is uneconomical.

Some metal halide complexes for the vulcanization of sulfur-curable polyurethane elastomers are known in the prior art. These compounds are usually metal halide complexes with organic compounds like mercaptobenzothiazole or metal halide complexes with tertiary amines. The latter materials tend to produce degradation and discoloration of the urethane polymers treated therewith; the former materials do not provide a sufficiently rapid cure of the polymer.

It has been found that improved sulfur cures of polyurethane polymers having pendant olefinic groups can be achieved by using metal halide complexes of certain hydroxyalkyl alkylene amines as accelerators. Complexes of this type and their preparation and use as accelerators are disclosed in the copending application of Harold Elkin, Serial No. 292,479, filed July 2, 1963. The present application is concerned with an improved method of making complexes of this type.

It is accordingly an object of the present invention to provide an improved method of making metal co-ordination complexes of hydroxyalkyl alkylene diamines. It is another object of the invention to provide a method of making complexes of this type that are less hygroscopic than similar complexes made by previously proposed methods. Other objects of the invention are in part obvious and in part pointed out hereinafter.

The metal halide complexes prepared by the method of the invention are co-ordination complexes of an N,N,N',N'-tetrakis(hydroxyalkyl)alkylene diamines and the salts of a heavy metal halide and are characterized by the formulae:

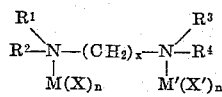

and

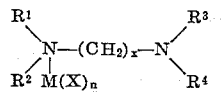

in which $R^1$, $R^2$, $R^3$, and $R^4$ represent the same or different hydroxyalkyl radicals; M and M' represent the same or different heavy metal atoms; X and X' are the same or different halides; $n$ and $n'$ represent the valence of M and M'; and $x$ represents an integer of from 2 to 6. These compounds, when prepared by the present method as described below, are characterized by surprisingly low hygroscopicity.

The hydroxyalkyl radical is preferably a lower alkyl radical, for example, those having from two to four carbon atoms. Typical of suitable radicals are the 1-hydroxyethyl, 1-hydroxypropyl, 1-hydroxybutyl, 2-hydroxybutyl and 3-hydroxybutyl radicals. A preferred hydroxyalkyl radical is the 2-hydroxypropyl radical.

M and M' are heavy, metal atoms. Lead, zinc, cobalt, manganese, cadmium, chromium, antimony, tin, and tellurium are among the suitable elements; zinc, cadmium, chromium, cobalt and manganaese are preferred.

These products are solid, high melting chemical complexes which are normally produced in the form of free flowing powders. As disclosed in Elkin application Serial No. 292,479 referred to above, these complexes are preferably prepared by reacting one or more heavy metal halides with an N,N,N',N'-tetrakis(hydroxyalkyl)ethylene diamine in an inert solvent medium and recovering the solid product.

It has now been found that the type of solvent used as a reaction medium has an important bearing on the hygroscopicity of the producets obtained. When, for example, water or an alcohol is used as the solvent, the products tend to be undesirably hygroscopic, i.e. if the products are exposed to the atmosphere at 73° F. and 50% relative humidity, they tend to become pasty within a relatively short period of time.

It has now been discovered that a high rate of moisture pick-up can be eliminated, facilitating the handling and storage of these products if the reaction is carried out using acetone as the solvent medium. When acetone is used in the manner described below, the products obtained absorb water at a much lower rate and hence are more stable in storage.

There are other advantages in using acetone as the solvent medium. Because the complex is insoluble in acetone and precipitates out of the solvent on formation, there is very little contamination of the product by the soluble starting materials and any contaminaion is easily removed with an acetone wash. Furthermore, the product prepared in acetone may be readily dried without heating and the solvent recovery operation, desirable for the economical production of the complexes when water or alcohol are used as solvents, may be avoided. Indeed, the acetone solvent may be recycled directly for use in further processing.

The materials used in carrying out the present method and the reaction conditions employed are generally similar to those disclosed in the above-referred to Elkin application. Either a single metal halide or a combination of metal halides may be used. Where a mixture of metal halides is used, the product will contain a mixture of the metal halide complexes. Where less than two mols of the metal halide are reacted per mol of the diamine compound, the resulting complex product will contain, on the average, proportionally less of the metal halide and will be proportionally less active as an accelerating agent. It is preferable to use those complexes made with approximately two mols of the metal halide per mol of the diamine compound.

Typical of the heavy metal halides suitable for use in the process of the present invention are the chloride, bromide, and iodide salts of lead, zinc, cobalt, manganese, chromium, antimony, tin and tellurium.

The N,N,N',N' - tetrakis(hydroxyalkyl)alkylene diamines preferably used in preparing the products of the invention are N,N,N',N'-tetrakis(hydroxy lower alkyl)- ethylene diamines. Especially useful is N,N,N',N'-(2-hydroxypropyl)ethylene diamine.

In an advantageous method of practicing the present invention, acetone and the N,N,N',N'-tetrakis(2-hydroxyalkyl)alkylene diamine are mixed in a reaction vessel. The metal halide is then added. An exothermic reaction occurs upon the addition of the halide and cooling means is usually required to maintain the temperature of the reactants below about 100° F. Alternately, the temperature may be controlled by adding the halide incrementally over a period of time to avoid a large temperature rise.

The acetone system is advantageously refluxed until the complex has formed. Upon its formation, the complex precipitates from solution and a slurry is formed and may be suitably maintained by the agitation of the refluxing system. After refluxing for about an hour, the contents of the reaction vessel are cooled, filtered and vacuum dried. The filtrate may be reused in subsequent reactions.

It is desirable that the reaction vessel in which the complex is formed have a glass or enamel, rather than a metal, liner in order to obviate the possibility of the metal halide reacting with the metal surface of the reaction vessel.

The instant novel complexes are very useful as compounding ingredients in the sulfur-curing of polyurethane polymers having olefinic side chains such as polyalkyleneether or polyalkyleneester polyurethane polymers. Conventional elastomer processing steps may be used in the fabrication of cured articles. In carrying out the process of the present invention for molded articles, the uncured polyurethane polymer is normally milled to a smooth sheet on a rubber mill and the various ingredients are incorporated by intimate mixing with the polymer on a mill. The composition is then sheeted off the mill, placed in a suitable mold, which is then closed, and the curing process is completed by heating the mold. The temperature and time used to effect a cure are interrelated. Higher temperatures permit shorter cure times; lower temperatures require longer cure times. In general, a curing time of about 45 minutes is adequate when a curing temperature of about 285° F. is used.

Those metal halide complexes made with two mols of metal halide per mol of diamine are incorporated with the other ingredients in the polyurethane polymer cure system in the range of 0.2 to 5.0, and preferably from 0.5 to 2.5, parts per 100 parts of polymer.

The amount of sulfur which is used may range from 0.1 to 3.0, and preferably 1 to 3, parts per 100 parts of polyurethane polymer. Compositions containing larger amounts of sulfur result in products with higher modulus values. Other materials that may be used in these cure systems include the 2,2'-dithiobisbenzothiazole and 2-mercaptobenzothiazole accelerators. The amount of 2,2'-dithiobisbenzothiazole which is used should range from 0.5 to 10, and preferably 3 to 5, parts per 100 parts of elastomer, however, it is understood that, as in the addition of sulfur, greater or lesser amounts may be used. In general, it is desirable to have a weight ratio of sulfur to 2,2'-dithiobisbenzothiazole or less than 1:1, with a preferred weight ratio range being from 1:4 to 3:5. The amount of 2-mercaptobenzothiazole which is used should range from 0.5 to 5 parts, and preferably approximate 2 parts, per 100 parts of elastomer; however, greater or lesser amounts may be used.

In addition to the ingredients discussed above which are normally used in the curing of urethane polymers according to the present invention, it is to be understood that other additives and compounding ingredients may be used also. Vulcanization accelerators and activating agents, such as cadmium stearate and zinc stearate, may be used. Fillers and pigmenting substances may also be used among which are hydrated silicas (such as those sold under the trade designation of Hi-Sil 233), inorganic pigments (such as those sold under the trade designations Ultramarine Blue and Titanox AMO), and carbon blacks (such as the super abrasion oil furnace black sold under the trade designation Philblack E).

A standard polymer system was prepared for use in the preparation of plastic-type compositions in which the utility and advantages of the aforementioned complexes could be demonstrated. For convenience, this polymer will be referred to henceforth as Polymer A. The method by which it was prepared follows:

A mixture of 297.6 grams (4.8 mols) of ethylene glycol, and 91.2 grams (1.2 mols) of propylene glycol was charged to a glass reaction vessel fitted with an agitator, thermometer, nitrogen inlet tube, steam jacketed condenser, cold water condenser. The latter is utilized for refluxing the water produced during the reaction. A distilling head was provided for the removal of water produced during the reaction. To the reaction mixture, 800 grams of adipic acid were added; this quantity of adipic acid (5.5 mols) was selected to provide an excess of the hydroxy acid and thus assure that the copolyester molecules would be hydroxy terminated. It was desired that the product be a copolyester glycol with a hydroxyl value of 1.13% and a theoretical molecular weight of 3000.

This mixture was heated to 160° C. under nitrogen purging and with stirring. As esterification proceeded, the water of reaction was refluxed until the temperature of the reaction system fell to 130° C. Then the water was allowed to distill from the reaction mix. As the water was removed from the system, the reaction temperature was allowed to rise to 200° C., until about 97% of the theoretical quantity of water from the esterification reaction had been removed. The heating was continued until an acid number of somewhat less than 3 was obtained. The reaction was then stopped by cooling the mix to ambient temperature. The copolyester glycol so produced had a number average molecular weight of about 2900 as determined by end group analysis.

Of the copolyester glycol produced above, 361.13 grams (0.25 equivalent weight) were charged to a glass reactor fitted with agitator, thermometer, feed funnel and cold water reflux condenser which was open to the atmosphere through a drying tube. The temperature of the reaction system was raised to 50° C. whereupon 47.0 grams of an isomer mixture consisting of 4 parts by weight of 2,4-tolylene diisocyanate and 1 part by weight of 2,6-tolylene diisocyanate was added over a 10-minute period. The reaction proceeded under a blanket of nitrogen at 80° C. for 4 hours. The isocyanate-terminated prepolymer had about 3% by weight of reactive isocyanate.

A quantity of 702 grams of the prepolymer was charged to a glass reactor fitted with an agitator, thermometer, and a filling funnel open to the atmosphere through a drying tube. The temperature of the reaction system was raised to 80° C. Thirty-three grams (0.25 mol) of glycerol alpha allyl ether (GAE) were charged into the reactor within a 10-minute interval with vigorous agitation. Mixing was continued for 15 minutes. The temperature of the reaction system was maintained at 80° C. for 4 additional hours. At the end of this time, the reaction product was placed in an oven at 100°–125° C. for 24 hours. A firm, light-amber colored, polyurethane crude rubber, Polymer A, was obtained which showed excellent processing characteristics on a mill with roll temperatures of 150° F. Using the small spindle for 10 minutes at 212° F., the material exhibited a Mooney viscosity of 42. The Shore A hardness value was 35. When the material was aged at about 75° F., the hardness increased, reaching 39 after 2 weeks and leveling at 45 after 16 weeks.

In order to point out more fully the nature of the present invention, the following specific examples are given as illustrative embodiments of the persent process and products produced thereby. These examples illustrate the preparation of the novel metal complex accelerators and also illustrate the preparation of polymer compositions in which the accelerators are utilized. The proportions of the ingredients in the polymer compositions are given in parts by weight. In each instance, if not otherwise stated, the rubber composition was blended on a rubber roll mill and then cured at 287° F., for 45 minutes. The mechanical properties of the cured compositions were measured after this heat treatment. The elongation and permanent set were recorded as a percentage of the original sample's dimension. Tear resistance was measured in pounds per inch.

Example 1

A one liter, glass, round-bottomed, three-necked flask was equipped with reflux condenser, mechanical stirrer and a thermometer. Over a 15-minute period, 200 ml. of acetone, 101.4 grams of N,N,N',N'-tetrakis(2-hydroxypropyl)ethylene diamine, and 95 grams of $ZnCl_2$ were added sequentially to this flask with stirring. The temperature rose from 25 to 54° C. At this point 25 ml. of acetone were added to the reactor. Thereafter, the contents were maintained at reflux temperatures for 30 minutes, at the end of which time the mix appeared to thicken. An additional 133 ml. of acetone was then charge to the pot. After another 40 minutes, heating was discontinued and the pot contents were permitted to cool to 25° C. The solid product was separated by filtration through a Buechner funnel and dried for approximately 16 hours at 1 in. Hg. absolute pressure in an oven set at 50° C. A clean, dry, non-hygroscopic, white, powdered product was obtained which had a melting point range of 198–204° C. This material was identified as N,N,N',N'-tetrakis(2-hydroxypropyl(ethylene diamine:$ZnCl_2$ complex. The amount of product obtained was 158.4 grams, 81% of the theoretically possible yield. The complex was divided into a number of portions and the following compositions were prepared:

|  | 1 | 2 | 3 | 4 |
|---|---|---|---|---|
| Polymer A | 100 | 100 | 100 | 100 |
| Benzothiazyl disulfide | 4.7 | 4.7 | 4.7 | 4.7 |
| 2-Mercaptobenzothiazole | 1.5 | 1.5 | 1.5 | 1.5 |
| N,N,N',N'-tetrakis(2-hydroxypropyl)ethylene diamine:$ZnCl_2$ complex | 0.16 | 0.32 | 0.645 | 1.29 |
| Cadmium Stearate | 0.5 | 0.5 | 0.5 | 0.5 |
| Titanox AMO | 15.0 | 15.0 | 15.0 | 15.0 |
| Hydrated Silica | 10.0 | 10.0 | 10.0 | 10.0 |
| Sulfur | 1.0 | 1.0 | 1.0 | 1.0 |

The physical properties were measured after a 45-minute cure at 287° F. The results are given below:

|  | 1 | 2 | 3 | 4 |
|---|---|---|---|---|
| Tensile Strength | 4,615 | 5,120 | 5,040 | 4,420 |
| Elongation | 670 | 650 | 615 | 586 |
| Tear Resistance | 240 | 250 | 270 | 250 |
| Permanent Set | 12.5 | 10.9 | 9.3 | 7.8 |

Example 2

A five-gallon stainless steel reactor, equipped with cooling coils, was charged with 8.28 liters of acetone and 5.16 pounds of N,N,N',N'-tetrakis(2-hydroxypropyl)ethylene diamine while stirring. To this mix was added 4.84 pounds of powdered zinc chloride. The temperature of the reactants was maintained below 100° F. by utilizing the cooling coils. The reactants were then heated to about 135° F. and maintained at that temperature for about 30 minutes. Then the mix was cooled to about 80° F. The product was filtered. An acetone-wet filter cake was obtained and dried at about 140° F. and 0.9 in. Hg. absolute pressure for about 16 hours. A powdery, white, non-hygroscopic solid having a melting point of 205–210° C. was obtained and identified as N,N,N',N'-tetrakis(2-hydroxypropyl)ethylene diamine:$ZnCl_2$ complex.

It is of course to be understood that the foregoing examples are intended to be illustrative and that numerous changes can be made in the ingredients, proportions, and conditions set forth therein without departing from the spirit of the invention as defined in the appended claims.

I claim:
1. A process for preparing compounds useful in vulcanizing polymers comprising reacting a heavy metal halide and an N,N,N',N'-tetrakis(hydroxyalkyl)alkylene diamine in acetone to form a solid reaction product, and recovering said solid reaction product.
2. A process as in claim 1 where the reaction in acetone is carried out under reflux conditions.
3. A process as in claim 1 wherein the N,N,N',N'-tetrakis(hydroxyalkyl)alkylene diamine is N,N,N',N'-tetrakis(hydroxyalkyl)ethylene diamine.
4. A process as in claim 1 wherein the N,N,N',N'-tetrakis(hydroxyalkyl)alkylene diamine is N,N,N',N'-tetrakis(hydroxypropyl)alkylene diamine.

No references cited.

TOBIAS E. LEVOW, *Primary Examiner.*

A. P. DEMERS, *Assistant Examiner.*